(12) United States Patent  
Jayaram et al.

(10) Patent No.: US 6,735,545 B2
(45) Date of Patent: May 11, 2004

(54) METHOD AND SYSTEM FOR DETERMINING A DESIRED MACHINE AS A FUNCTION OF QUALITY REQUIREMENTS OF MACHINED PARTS

(75) Inventors: Suresh Jayaram, Peoria, IL (US); David D. Smith, Fairview, IL (US)

(73) Assignee: Caterpillar Inc, Peoria, IL (US)

( * ) Notice: Subject to any disclaimer, the term of this patent is extended or adjusted under 35 U.S.C. 154(b) by 265 days.

(21) Appl. No.: 09/911,182

(22) Filed: Jul. 23, 2001

(65) Prior Publication Data

US 2003/0018448 A1 Jan. 23, 2003

(51) Int. Cl.[7] .................................................. G01D 1/00
(52) U.S. Cl. ........................ 702/127; 700/103; 700/104
(58) Field of Search ................................ 700/103, 104, 700/159, 182, 173, 174, 175, 97, 98; 702/127

(56) References Cited

U.S. PATENT DOCUMENTS 5,378,218 A * 1/1995 Daimaru et al. ................ 483/9
5,691,909 A 11/1997 Frey et al.
5,841,668 A 11/1998 Pahk et al.

\* cited by examiner

*Primary Examiner*—John Barlow
*Assistant Examiner*—Stephen J. Cherry
(74) *Attorney, Agent, or Firm*—Steve D Lundquist; Robin S Fahlberg

(57) ABSTRACT

A method and system for determining a set of desired machine specifications. The method and system includes inputting a set of data to a processor, the data including information relevant to a machine, a machine tool, and a machined part, determining a required set of specifications of the machine as a function of the data, and outputting the required set of specifications to a user.

20 Claims, 7 Drawing Sheets

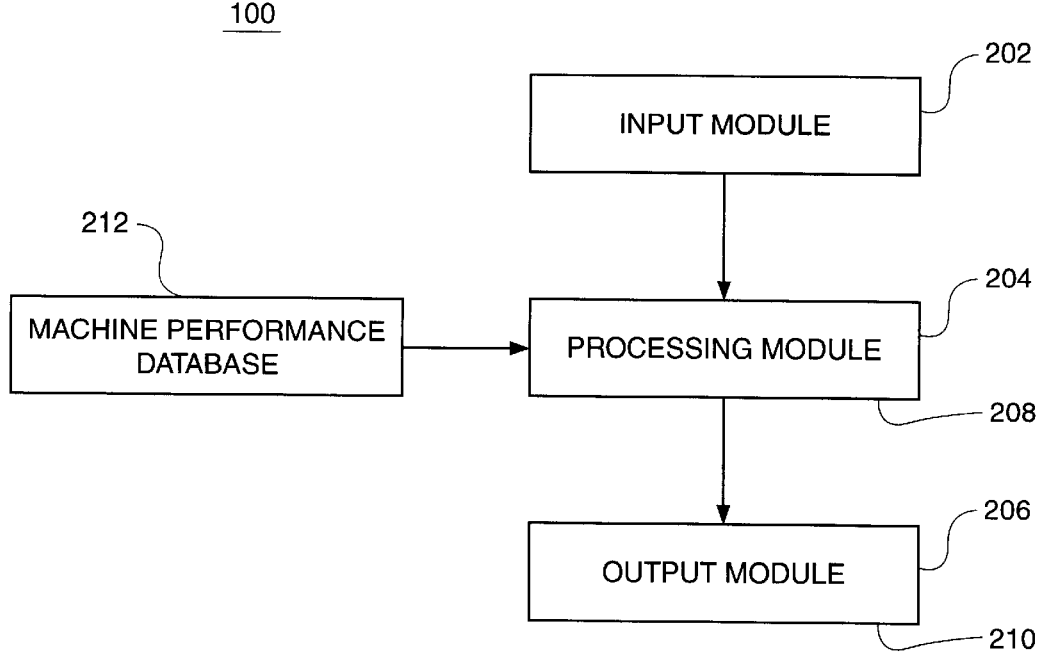
Fig-2-

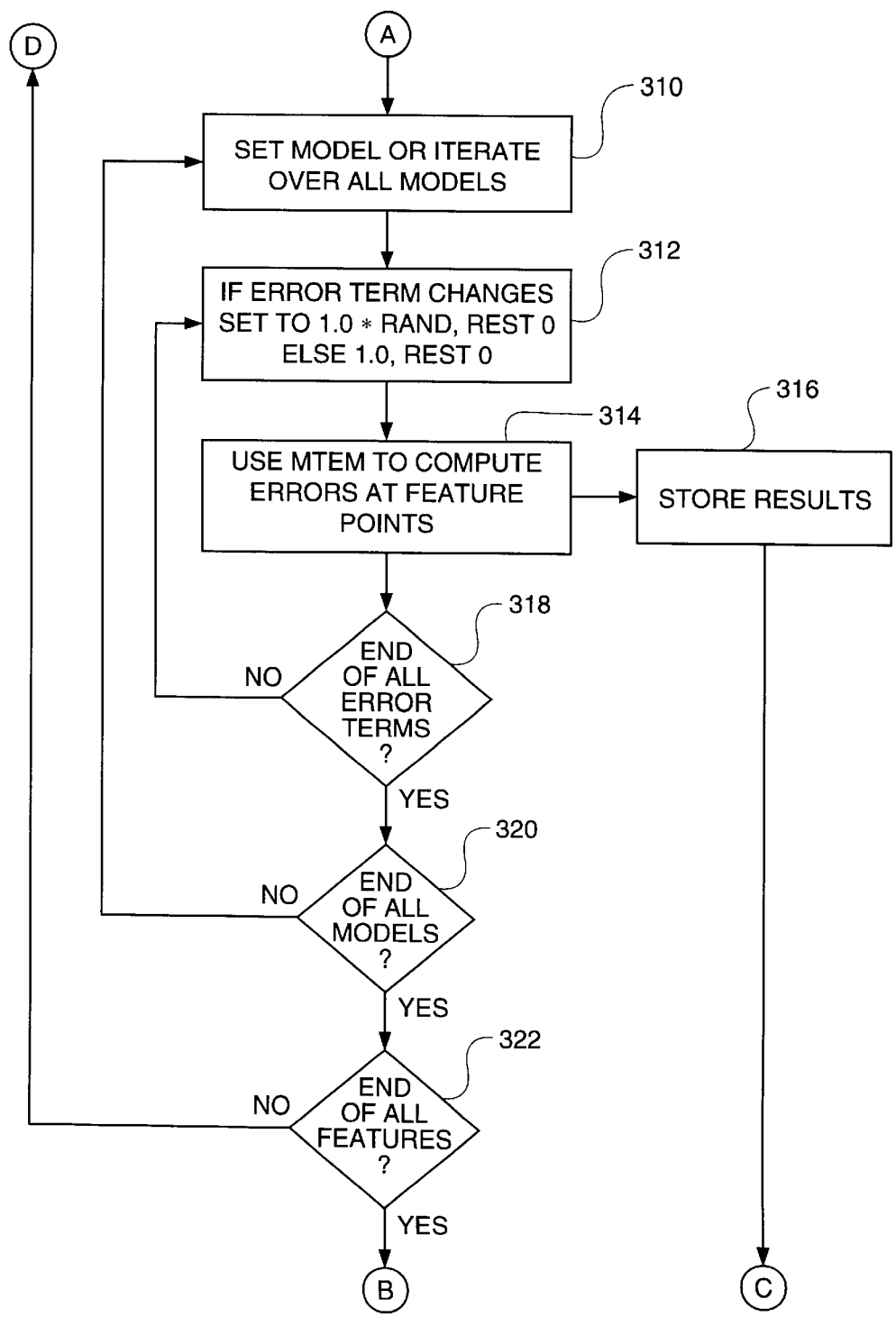
Fig-3b-

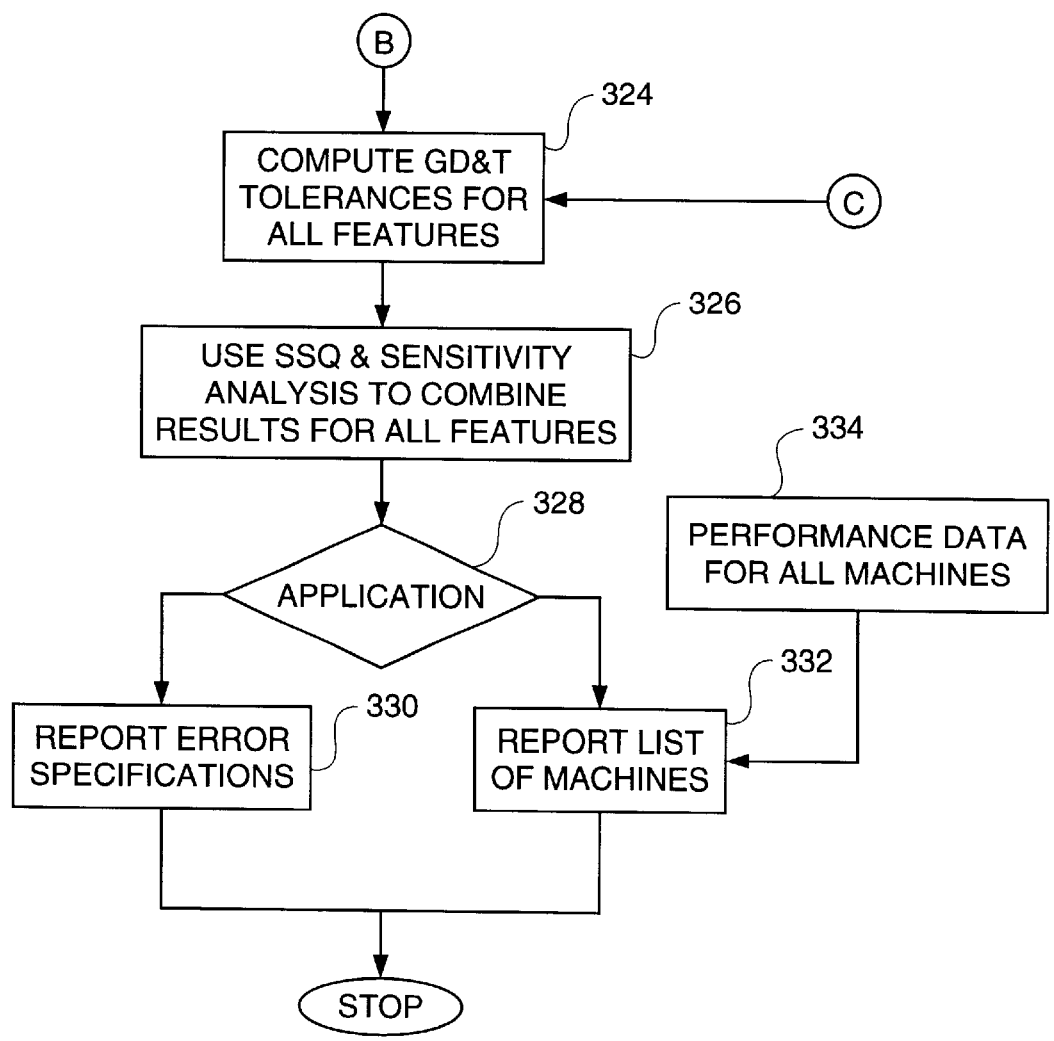
Fig-3c-

Fig-4-
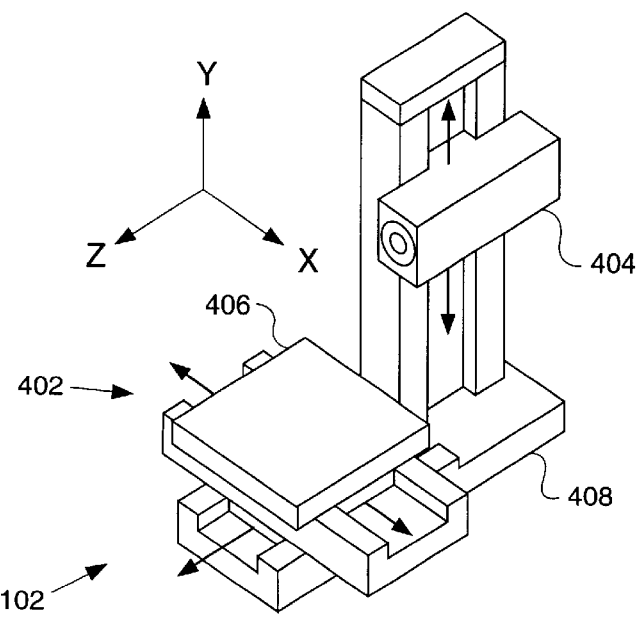
Fig-5-
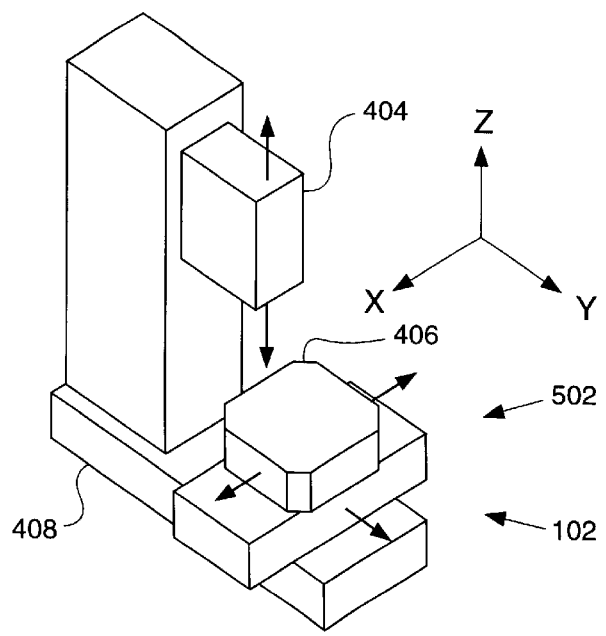

METHOD AND SYSTEM FOR DETERMINING A DESIRED MACHINE AS A FUNCTION OF QUALITY REQUIREMENTS OF MACHINED PARTS

TECHNICAL FIELD

This invention relates generally to a method and system for determining a machine suitable for manufacture of desired parts and, more particularly, to a method and system for determining a desired machine based on quality requirements of the parts to be manufactured.

BACKGROUND

The manufacturing industry is under increasingly more stringent demands to manufacture parts having high precision tolerances in order to remain competitive and successful. For example, the various parts manufactured for an internal combustion engine must meet exacting standards for tolerances to achieve maximum power and efficiency of the engine. Machine parts, electronic components, and various other manufactured products are required to be increasingly accurate and of the highest manufactured quality for industry to succeed.

The precision and accuracy of machined parts can only be a function of the specifications of the machines and machine tools which manufacture the parts. Various machine specifications, such as positioning of the axes along which the tool moves, straightness of the axes, roll, pitch, yaw, and squareness, are critical factors in determining the tolerances of the finished product. It is vital to use machines which meet the minimum accuracy specifications. On the other hand, a machine which is much more accurate than needed for a particular application may be much more costly than needed. Therefore, it is important to choose the correct machine for the required task.

Attempts have been made to predict the accuracy of machined parts by certain machines and machine tools to determine whether the machine will do the required job. For example, in U.S. Pat. No. 5,691,909, Frey et al. uses virtual machining to determine the outcome of a machine having known specifications. The virtual machining method taught by Frey et al. provides information regarding a particular machine, which can be used to determine any sources of errors in the machine, or to determine that the machine does not perform an adequate job.

The shortcomings of the patent of Frey et al. is that only one particular machine is analyzed for each virtual machining setup. Although this feature may be useful in diagnosing problems with a particular machine, it would become very cumbersome if one was attempting to determine which machine is best for the job. An efficient and accurate method is desired to enable determination of which machine, out of many possibilities, would be the best choice for a manufacturing setup. Thus, it is desired to start at the opposite end from the method of Frey et al., and determine the proper machine to use based on the required finished tolerances of the part itself. More specifically, it is desired to have the ability to determine the required specifications for a machine based on a set of required tolerances of the finished part.

The present invention is directed to overcoming one or more of the problems as set forth above.

SUMMARY OF THE INVENTION

In one aspect of the present invention a method for determining a set of desired machine specifications is disclosed. The method includes the steps of inputting a set of data to a processor, the data including information relevant to a machine, a machine tool, and a machined part, determining a required set of specifications of the machine as a function of the data, and outputting the required set of specifications to a user.

In another aspect of the present invention a method for determining a set of desired machine specifications is disclosed. The method includes the steps of inputting information to a processor, the information being relevant to a machine, a machine tool, and a machined part, including information relevant to allowable tolerances of the machined part, determining a required set of specifications of the machine as a function of the information, including machine error specifications, and outputting the required set of specifications to a user.

In yet another aspect of the present invention a method for determining a set of desired machine specifications by a processor is disclosed. The method includes the steps of receiving information relevant to a machine, a machine tool, and a machined part, the information relevant to the machined part including at least one machined part feature, determining a set of worst case points for each of the at least one machined part feature, determining a set of potential error terms corresponding to the set of worst case points, determining a set of geometric dimensions and tolerances of each of the at least one machined part feature as a function of the potential error terms, and determining a resultant set of machine specifications as a function of the geometric dimensions and tolerances.

In yet another aspect of the present invention a system for determining a set of desired machine specifications is disclosed. The system includes an input module for inputting information relevant to a machine, a machine tool, and a machined part, a processing module for determining a required set of specifications of the machine as a function of the input information, and an output module for outputting the required set of specifications.

In yet another aspect of the present invention a system for determining a set of desired machine specifications is disclosed. The system includes an input module for inputting information to a processor, the information being relevant to a machine, a machine tool, and a machined part, including information relevant to allowable tolerances of the machined part, a processing module for determining a required set of specifications of the machine as a function of the information, including machine error specifications, and an output module for outputting the required set of specifications.

In yet another aspect of the present invention a system for determining a set of desired machine specifications is disclosed. The system includes an input module for receiving information relevant to a machine, a machine tool, and a machined part, the information relevant to the machined part including at least one machined part feature, a processing module for, determining a set of worst case points for each of the at least one machined part feature, determining a set of potential error terms corresponding to the set of worst case points, determining a set of geometric dimensions and tolerances of each of the at least one machined part feature as a function of the potential error terms, and determining a resultant set of machine specifications as a function of the geometric dimensions and tolerances, and an output module for providing the determined set of machine specifications to a user.

BRIEF DESCRIPTION OF THE DRAWINGS

FIG. 2 is a block diagram illustrating a preferred embodiment of the present invention;

FIGS. 3a–3c is a flow diagram illustrating a preferred method of the present invention;

FIG. 4 is a diagrammatic illustration of an exemplary horizontal machine;

FIG. 5 is a diagrammatic illustration of an exemplary vertical machine; and

DETAILED DESCRIPTION

Figure 1:
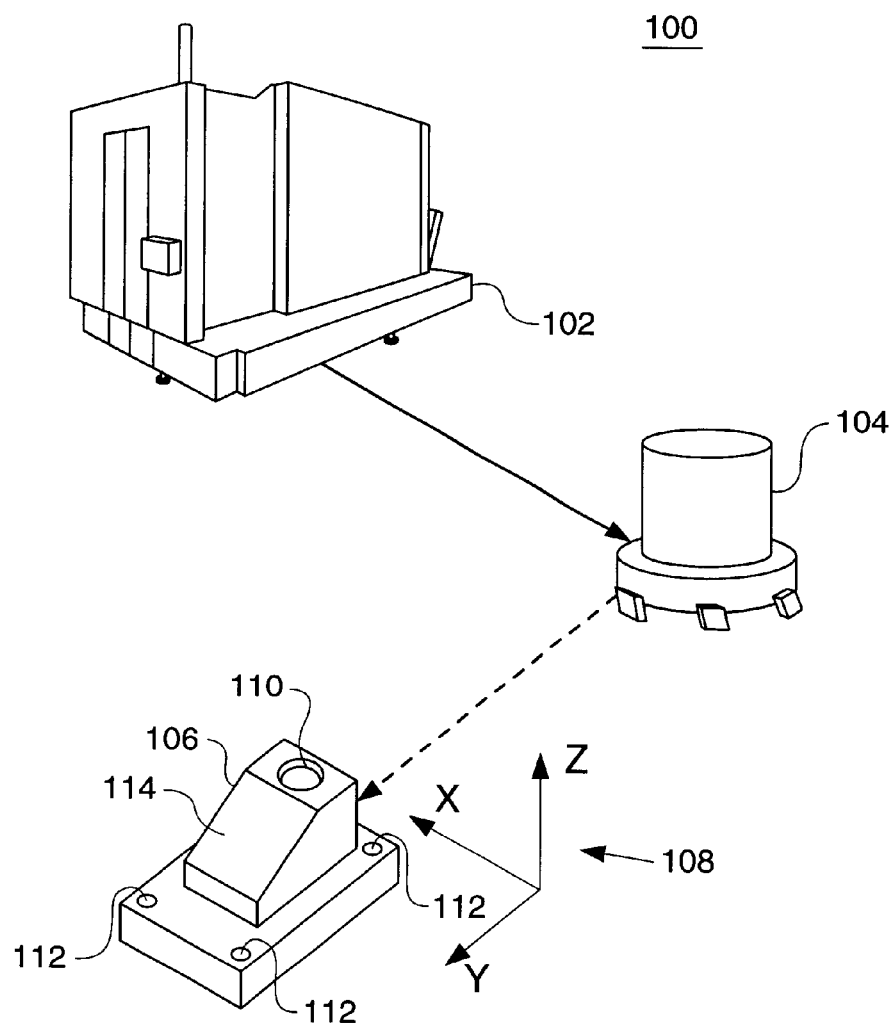
FIG. 1 is a diagrammatic illustration of a machine, a machine tool, and a machined part suitable for use with the present invention.

Referring to the drawings and the accompanying claims, a method and system 100 for determining a desired machine 102 as a function of quality requirements of machined parts 106 is shown.

With particular reference to FIG. 1, a machine 102 is shown.

Preferably, the machine 102 includes at least one machine tool 104 controllably attached to perform a desired work function, i.e., to perform a machine operation on a machined part 106. It is understood that the term "machined part" 106, for purposes of describing the present invention, refers herein to a part being machined, regardless of the level of completion of the machine process. Thus, a part is referred to as a machined part 106 even though no machining may have yet been performed.

The machine 102 is representative of many types of manufacturing machines. For example, machines used to cut, mill, bore, plane, and the like are used in a wide variety of applications. One example would be the many types of machines used to manufacture parts for internal combustion engines. Machines, however, may be adapted and used for other applications as well. For example, the manufacture of complex micro-electronic components, such as sheets of integrated circuits, requires the use of precision machines. The present invention, as evident from the discussion below, is suited for use with the many types of machines available.

The machine tool 104 is controllably attached to the machine 102 and is used to perform a machine work function, such as boring, cutting, grinding, milling, manipulating parts, assembly, alignment, and the like. The machine tool 104 depicted in FIG. 1 exemplifies a tool 104 for milling a plane surface of a machined part 106. However, any of a variety of other types of machine tools 104 could have been shown as well. In addition, more than one machine tool 104 may be used on a machine 102 to perform multiple tasks.

The machined part 106 represents a part being machined throughout one or more processes. For example, a machined part 106 may have holes bored by a machine 102, may have portions cut by a machine 102, and may be planed or milled by a machine 102. The machine 102 may be one machine set up to perform several functions, or may be a plurality of machines, each designed to perform a specific work task. Furthermore, a machine 102 may be used to machine more than one type of machined part 106. In this embodiment, the machine 102 would be set up to perform the desired tasks on the particular type of machined part 106 to be worked on at a particular time.

Referring to FIG. 2, a block diagram illustrating a preferred embodiment of the present invention is shown. The block diagram is representative of a system 100 for determining a set of desired machine specifications.

An input module 202 inputs information relevant to the machine 102, the machine tool 104, and the machined part 106. The information includes data relevant to allowable tolerances of the machined part 106, and includes information which defines at least one machined part feature, such as specifications related to a planar surface, a cylinder, and the like. The information being input into the input module 202 is described in more detail below. The input module 202 may be any of a number of types, such as a keyboard, a data stream connection from another computer or database, a scanner, or any combination thereof.

A processing module 204 determines a required set of specifications of the machine 102 as a function of the input information, including machine error specifications. Preferably, the processing module 204 includes a processor 208, for example, a computer-based processor 208. The functions performed by the processing module 204, relevant to the present invention, are described in more detail below.

An output module 206 outputs the required set of specifications to a user. In the preferred embodiment, the output module 206 includes a display 210 for providing a graphical user interface to a user. The display 210 may also be used to indicate the information being provided to the input module 202. The output module 206 may also provide output information to another device, such as a printer (not shown), an output data stream to another computer or database (not shown), or to some other destination, such as is well known in the art.

A machine performance database 212 provides a list of machines 102 to the processing module 204 to enable the processing module 204 to determine which machines 102 may have the required set of specifications. For example, when the required set of specifications is determined, it may be desired to determine which machines meet the requirements.

Figure 3A:
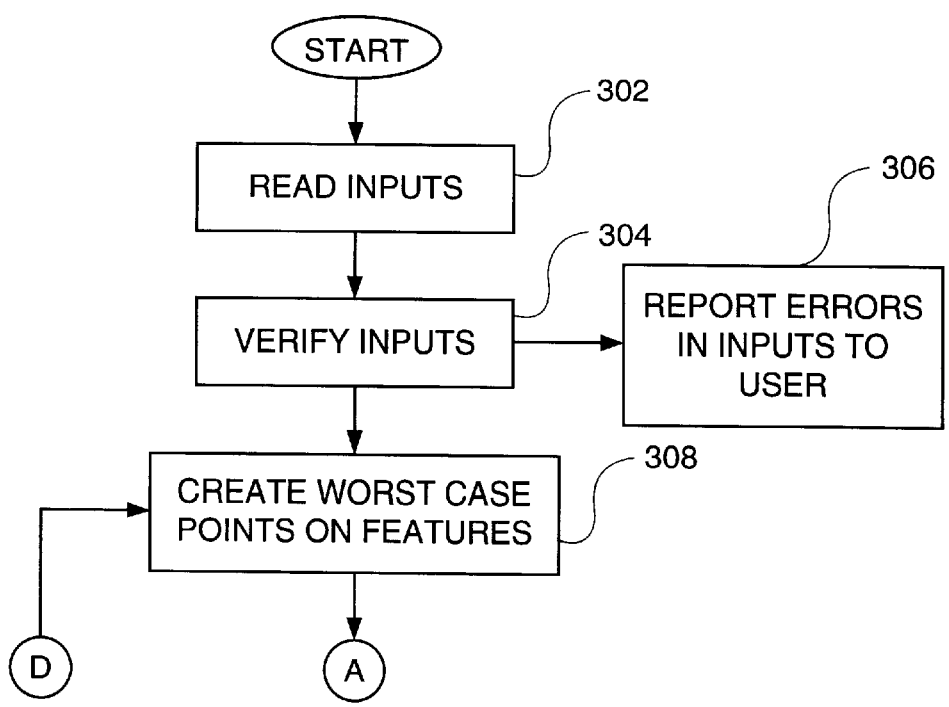

Referring to FIGS. 3a–3c, and with continued reference to FIGS. 1 and 2, a flow diagram illustrating a preferred method of the present invention is shown.

In a first control block 302, various information inputs are read into the input module 202. Preferably, the input data includes information relevant to the machine 102, the machine tool 104, and the machined part 106.

The paragraphs below describe a number of exemplary types of information to be input. It is noted that the types of inputs are not intended to be all-inclusive, but are a representative list of input data suited for use with the present invention.

A desired machine configuration may be input to specify the type of machine 102 that will be used to machine the machined part 106. However, if the user does not know the type of machine 102 to use, a number of types may be input and analyzed to determine the most desirable. In the preferred embodiment, for a multi-axis machine 102, a machine 102 may be either a horizontal machine 402 or a vertical machine 502, as exemplified in FIGS. 4 and 5. A multi-axis machine 102 is, in a typical designation, identified with respect to the configuration of the machine 102 with respect to a coordinate system, such as an x, y, z system. For example, the horizontal machine 402 depicted in FIG. 4 would be designated as an XZFY machine 102, since the y axis contains a spindle 404, and a table 406 sits on the x axis which sits on the z axis. The letter "F" in the XZFY designation refers to a frame 408 of the machine 102, and the order of the letters refers to a loop traveled from the table 406 to the spindle 404. In like manner, the vertical machine 502 shown in FIG. 5 would be designated as an XYFZ machine, since the table 406 is mounted on the x axis, which is mounted on the y axis, and the spindle 404 is mounted on the z axis. It is noted that, under this designation scheme, a number of machine configurations may be defined, and the two exemplary machines 402, 502 described above are but two of many available machine configurations.

Information relevant to a work volume of the machine 102 may be input to specify dimensions such as the distance that the spindle 404 can travel in each direction, i.e., in an x, y, z direction. For example, a machine 102 having a work volume of 800×700×600 (in mm) has a spindle 404 that can move 800 mm in the x direction, 700 mm in the y direction, and 600 mm in the z direction. If the user, however, does not know this information, it may be possible, in the preferred embodiment, to have the capability to enter a generic machine work volume, such as small, medium, and large. Each generic work volume would have a set of dimensions of a typical machine of the size selected.

Information relevant to a maximum deviation of the machine tool 104 from an intended path may be entered. Preferably, the maximum deviation corresponds to a maximum error of the path of the machine tool 104, such as a maximum linear error and a maximum angular error. The maximum linear error represents a deviation of the machine tool 104 from a straight line travel path, and a maximum angular error represents how much the machine tool 104 rotates or wobbles as it travels along an axis. Typically, these maximum error values will not be known. Therefore, in the preferred embodiment, a generic choice may be made from a table of choices, such as a "weak machine", "typical machine", "accurate machine", and the like. Each of these choices would assign a set of values typical for the designation.

Information representing a quality index Cp of the machine 102 may be entered. The quality index Cp is a function of a percent contribution of the machine 102 to a quality of the machined part 106. Typically, the machine 102 only contributes a small percentage of the error, e.g., 10% to 50%. Other contributors to error include the machine tool 104, the machined part 106, and errors associated with heat generated and the like. Preferably, the quality index Cp is expressed as a numerical value. For example, exemplary values of Cp may be Cp=1.0 for a 45% machine error, Cp=1.3 for a 33% machine error, Cp=1.6 for a 27% machine error, Cp=2.0 for a 22% machine error, and the like. Thus, as the desired accuracy of the machine 102 increases, i.e., reduced percentage of machine error, a higher value of Cp is chosen.

Information relevant to at least one feature of the machined part 106 may be input. Preferably, this information would include data relevant to allowable tolerances of the machined part 106. A typical machined part 106 will have several features. For example, the machined part 106 depicted in FIG. 1 has a first feature defined as a hole 110 through a top portion of the part 106, a second feature defined as a hole 112 through a base portion of the part (more specifically, a set of holes 112 through the base portion), and a third feature defined as a flatness portion 114, i.e., the inclined surface portion of the part 106. It is obvious that additional features exist and would be defined in the present invention. However, the features described above provide examples of features for purposes of explanation.

Each feature will have associated tolerances, such as flatness, straightness, circularity, cylindricity, and the like. For example, the flatness portion 114 may have tolerances related to flatness and straightness, and the holes 110,112 may have tolerances related to circularity and cylindricity, and perhaps straightness as well. Typically, these tolerance values are obtained from a part print or a solid model of the part 106.

In addition, each feature will have an associated orientation. For example, referring to the machined part 106 in FIG. 1, the holes 110,112 are found to be in the z direction, and the flatness portion 114 is in a plane defined by the y and z axes.

The size of the feature may be desired as well, since larger size features are more difficult to machine to desired tolerances than smaller size features.

Figure 6A:
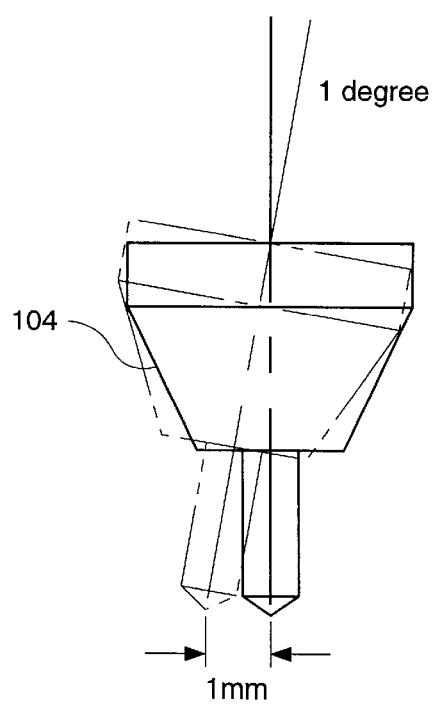
FIGS. 6a–6b are diagrammatic illustrations of a machine tool showing the effects of size of the tool.
Figure 6B:
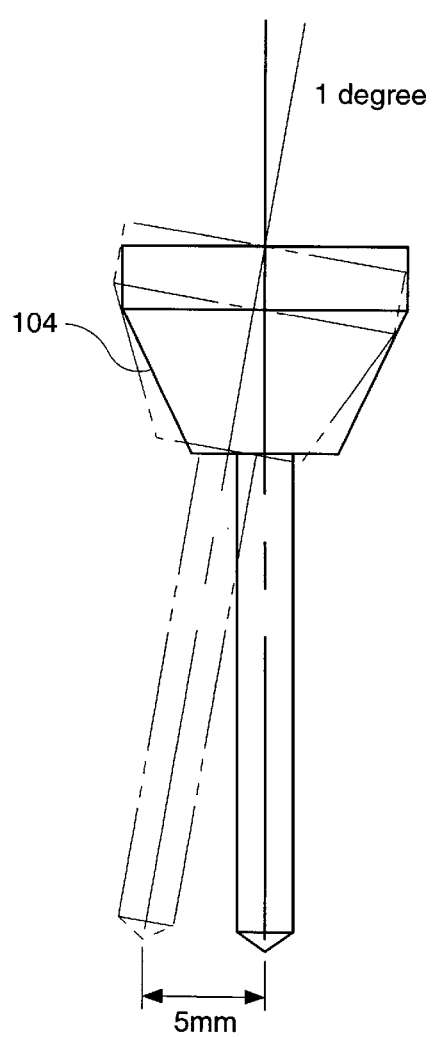

Information relevant to the size of the machine tool 104 may be input. Larger machine tools 104 tend to contribute more to machine tool errors, as is shown in FIGS. 6a–6b. In FIG. 6a, a machine tool 104, depicted as a drill, is tilted by a one degree angle. The resultant error at the end of the tool 104 is 1 mm. However, in FIG. 6b, the machine tool 104 is larger. The same one degree of tilt results in an error at the end of the tool 104 of 5 mm.

Information defining at least one axis for the machine tool 104 to travel to make each feature of the machined part 106 may be entered. For example, in FIG. 1, to mill the flatness portion 114, it may be desired to move the machine tool 104 along the x and z axes only. Alternatively, if it is desired to move the machine tool 104 across the flatness portion 114 as well, it would be desired to move the machine tool 104 in the x, y, and z axes. In like manner, a boring tool would be required to move in the z axis only to drill the holes 110,112.

It is understood that the above examples of types of information to input are not meant to be all-inclusive, and that other types of data may be input as well. Furthermore, not all of the above examples are required for purposes of the present invention.

In a second control block 304, the inputs are verified, preferably for consistency, completeness, and reasonableness. If any possible input errors are detected, they are reported to the user, as shown by a third control block 306.

In a fourth control block 308, the first of a series of steps for determining a required set of specifications of the machine 102 as a function of the input data is shown, the specifications preferably including allowable machine error specifications. More specifically, in the fourth control block 308, a set of worst case points for each feature is determined. Typically, this step is performed if the dimensions and coordinates of the feature of the machined part 106, i.e., subsequent to the machining process, are not known. The worst case points are determined as a function of a set of coordinates of a central point of the machine tool 104, and a set of coordinates of an offset point on the machine tool 104 based on dimensions of the tool 104. Preferably, these points are determined with respect to the commanded positions of the machine tool 104 during the machining process. For example, a milling tool may be commanded to move along the x axis from a start point to an end point during milling of the machined part 106. In addition, this movement may take place along a y axis coordinate, thus representing a coordinate along the width of the machined part 106. The diameter of the machine tool 104 may be used to determine additional points, as well as the offset height of a cutter portion of the machine tool 104. All of these factors may be used to determine a set of points which, in a three axis field of motion, may be as much as 64 points.

Control proceeds to a fifth control block 310, in which a model type is set based on user input as described above. Alternatively, if the user does not know what model type of machine 102 will be used, the fifth control block 310 will iterate the solution over all possible machine configurations and then choose the worst case solution. The fifth control block 310 works in coordination with a second decision block 320 to perform the steps for solution repeatedly until all possible solutions have been solved.

In a sixth control block 312, the system 100 takes into account the movement of the machine tool 104 along any axis, and responsively creates new error terms for the changed positions of the machine tool 104. The use of error terms is described in detail below. As an example of the function of the sixth control block 312, if the machine tool 104 moves along the x axis, then all error terms associated with the x axis will be modified to reflect this movement. More specifically, in the preferred embodiment, for movement along the x axis, error terms such as $\delta_{xx}$ may be iterated at two states: $\delta_{xx}=0$ and $\delta_{xx}=1$, where, in the expression $\delta_{ij}$, j represents a moving term. Error terms that are not in motion would preferably be set to only one state, i.e., $\delta_{ij}=1$.

In a seventh control block 314, the errors at individual data points are determined for each feature. More specifically, the errors are predicted based on known errors associated with the machined part 106 as a function of the set of potential error terms. It is noted that the sixth and seventh control blocks 312,314 are part of loops in which they are repeated for each error term, i.e., by a first decision block 318, for each model, i.e., by the second decision block 320, and for each feature, i.e., by a third decision block 322. After each loop, the seventh control block 314 delivers the solution for that loop to an eighth control block 316, in which the results are stored, preferably in a database.

In the preferred embodiment, the procedure in the seventh control block 314 operates as follows. Machine tool errors are classified as positioning errors, straightness errors, roll (i.e., angular) errors, and squareness errors. Positioning errors, $\delta_{xx}$, $\delta_{yy}$, and $\delta_{zz}$, are errors in the x, y, and z directions. Straightness errors, $\delta_{yx}$, $\delta_{zx}$, $\delta_{xy}$, $\delta_{zy}$, $\delta_{xz}$, and $\delta_{yz}$, are errors along the x, y, and z axes, i.e., $\delta_{yx}$ and $\delta_{zx}$ are errors along the x axis, $\delta_{xy}$ and $\delta_{zy}$ are errors along the y axis, and $\delta_{xz}$ and $\delta_{yz}$ are errors along the z axis. Roll errors are roll, pitch, and yaw errors along each respective axis. For example, $\epsilon_{xx}$, $\epsilon_{yx}$, and $\epsilon_{zx}$ are the roll, pitch, and yaw errors along the x axis. Similar errors are defined for the y and the z axes. Squareness errors are the errors between axes. For example, $\alpha_{xz}$ is the squareness error between the x axis and the z axis, $\alpha_{yz}$ is the squareness error between the y axis and the z axis, and $\alpha_{xy}$ is the squareness error between the x axis and the y axis.

The homogeneous error matrices in the x, y, and z directions are:

$$H_x = \begin{bmatrix} 1 & -\epsilon_{zx} & \epsilon_{yx} & x+\delta_{xx} \\ \epsilon_{zx} & 1 & -\epsilon_{xx} & \delta_{yx} \\ -\epsilon_{yx} & \epsilon_{xx} & 1 & \delta_{yx} \\ 0 & 0 & 0 & 1 \end{bmatrix} \quad (Eq.\ 1)$$

$$H_y = \begin{bmatrix} 1 & -\epsilon_{zy} & \epsilon_{yy} & \delta_{xy}-y\alpha_{xy} \\ \epsilon_{zy} & 1 & -\epsilon_{xy} & y+\delta_{yy} \\ -\epsilon_{yy} & \epsilon_{xy} & 1 & \delta_{zy} \\ 0 & 0 & 0 & 1 \end{bmatrix} \quad (Eq.\ 2)$$

$$H_z = \begin{bmatrix} 1 & -\epsilon_{zz} & \epsilon_{yz} & \delta_{xz}-z\alpha_{xz} \\ \epsilon_{zz} & 1 & -\epsilon_{xz} & \delta_{yz}-z\alpha_{yz} \\ -\epsilon_{yz} & \epsilon_{xz} & 1 & z+\delta_{zz} \\ 0 & 0 & 0 & 1 \end{bmatrix} \quad (Eq.\ 3)$$

For each machine configuration, e.g., XYFZ and the like, the resultant errors $\delta R_x$, $\delta R_y$, and $\delta R_z$ at a given point x, y, z in the machine tool workspace with tool offsets $x_p$, $y_p$, $z_p$ is given by:

$$\begin{Bmatrix} \delta R_x \\ \delta R_y \\ \delta R_z \\ 0 \end{Bmatrix} = (H_x H_y H_z^{-1}) \begin{Bmatrix} x_p \\ y_p \\ z_p \\ 1 \end{Bmatrix} - (H_x H_y H_z^{-1})_0 \begin{Bmatrix} x_p \\ y_p \\ z_p \\ 1 \end{Bmatrix}. \quad (Eq.\ 4)$$

In the preferred embodiment, Eq. 4 is used to determine the errors at each machining location.

In a ninth control block 324, a set of geometric dimensions and tolerances (GD&T) are determined for each machined part feature as a function of the potential error terms and as a function of the predicted set of errors. In the preferred embodiment, for a three axis machine 102, 21 sensitivity numbers, i.e., 21 errors, are determined. More specifically, for each axis, six errors, i.e., positioning, straightness (up/down), straightness (side/side), roll, pitch, and yaw, exist for a subtotal of 18 errors. In addition, 3 squareness errors between the 3 axes is added for a total of 21 errors. It is noted that for each additional axis, e.g., rotation and the like, six additional errors would be added.

In a tenth control block 326, using a sum-of-squares analysis and a sensitivity analysis, the resultant tolerance for each machined part feature is determined, from which a resultant set of machine specifications is derived. In the preferred embodiment, three approaches are used.

First, maximization of the products of the errors is used to determine the maximum volume of the product of the errors. This approach is needed since the solution is not unique and the number of iterations required using conventional methods would not be feasible. The method of maximization of the products of the errors will determine a machine 102 that meets the minimal requirements. An example of this method is shown by considering two errors e1 and e2 which if added together would equal a value less than 10. Thus, e1 could be 1 and e2 could be 9, or any of several other possible solutions. Using maximization of the products of the errors, e1*e2 is a maximum when e1=e2=5. Thus, 5 is the solution for e1 and e2.

Second, all nonlinearities are linearized, preferably by well known linearizing techniques, and the linear approximations are used in the sum-of-squares analysis above. Nonlinearities occur during tolerance computations and also exist in the machine error models depicted by Eqs. 1–4.

Third, external error sources are either factored in or discounted. Examples of external errors include, but are not limited to, ambient temperature changes, machining forces, residual stresses, errors in fixtures, geometric errors of the machine tool 104, and the like. A preferred method for accounting for external error sources is known in the present invention as error budgeting, and is a function of the quality index Cp described above. For a given value of Cp:

$$C_p = \frac{TOL}{6\sigma_T} \quad (Eq.\ 5)$$

where TOL is the tolerance on the machined part 106 and $\sigma$ is a standard deviation of the process. Assuming three major external error contributors:

$$\sigma_T^2 = \sigma_1^2 + \sigma_2^2 + \sigma_3^2 \quad (Eq.\ 6).$$

Using the concept of maximization of the products of the errors, all standard deviations are found to be identical. The error contribution of the machine 102 is therefore determined by:

$$Contrib = \frac{1}{\sqrt{3}\, C_p}. \quad \text{(Eq. 7)}$$

Thus, if Cp=2.0, the machine 102 can only contribute 28% of the tolerance.

The required set of specifications of the machine 102 are then output to a user. Preferably, in a fourth decision block 328, the user is given the opportunity to determine which application to output, i.e., whether to output a list of maximum allowable errors of the machine 102, as in an eleventh control block 330, or to output a list of machines 102 which have the required set of specifications, as in a twelfth control block 332.

In the eleventh control block 330, a list of maximum allowable errors is reported in an output format, e.g., the display 210, a printer (not shown), some other output device, or some combination thereof. The resultant list may then be used by an operator to choose a machine 102 that is suited to perform the desired work function.

In the twelfth control block 332, a list of machines 102 which have the required set of specifications is output. Preferably, the list of machines 102 is obtained from a thirteenth control block 334, in which data is accessed from the machine performance database 212. The resultant list may then be used to choose the machine 102 most suitable for the task.

INDUSTRIAL APPLICABILITY

As an example of application of the present invention, a user desires to determine a machine 102 which will perform the needed machining process or processes to provide a machined part 106 having the required tolerances. Furthermore, the user desires to avoid the added cost of selecting a machine 102 that is more accurate than needed. More specifically, the user desires to select a machine 102 that is the lowest cost choice that will still result in acceptable machined part tolerances.

In one aspect of the above example, the user may desire a list of maximum allowable errors of the machine 102 so that a suitable machine 102 may be purchased. In another aspect of the above example, the user may desire a list of machines 102 which have the required set of specifications so that a suitable existing machine may be chosen from among already existing machines 102.

The present invention is designed to allow a user to determine the desired machine 102 for the task as a function of the allowable tolerances of the finished machined part 106. Since a machine 102 may very likely be used to make more than one type of machined part 106, the present invention can be extended to determine the desired machine 102 for a plurality of tasks as a function of allowable tolerances of the various finished machined parts 106.

Other aspects, objects, and features of the present invention can be obtained from a study of the drawings, the disclosure, and the appended claims.

What is claimed is:

1. A computer-based method, for determining a set of desired machine specifications, including the steps of:

inputting a set of data to a processor, the data including information relevant to a machine, at least one machine tool, and at least one machined part, wherein inputting the set of data includes the steps of;
    inputting a desired machine configuration;
    inputting information relevant to a work volume of the machine;
    inputting information relevant to a maximum deviation of the machine tool from an intended path;
    inputting a quality index Cp of the machine, the quality index being a function of a percent contribution of the machine to a quality of the machined part;
    inputting information relevant to at least one feature of the machined part;
    inputting information relevant to a size of the machine tool; and
    inputting information defining at least one axis for the machine tool to travel to make the at least one feature of the machined part;
determining a required set of specifications of the machine as a function of the and outputting the required set of specifications to a user.

2. A method, as set forth in claim 1, wherein determining a required set of specifications of the machine includes the steps of:
    determining a set of worst case points for each of the at least one machined part feature;
    determining a set of potential error terms corresponding to the set of worst case points, the potential error terms being a function of errors associated with the machine and the machine tool;
    determining a set of geometric dimensions and tolerances of each of the at least one machined part feature as a function of the potential error terms; and
    determining a resultant set of machine specifications as a function of the geometric dimensions and tolerances.

3. A method, as set forth in claim 2, further including the step of predicting a set of errors associated with the machined part as a function of the set of potential error terms, the set of geometric dimensions and tolerances of each of the at least one machined part feature being further determined as a function of the predicted set of errors.

4. A method, as set forth in claim 2, wherein determining a resultant set of machine specifications includes the step of calculating a final resultant tolerance for each of the at least one machine part feature using a sum-of-squares analysis.

5. A method, as set forth in claim 4, wherein outputting the required set of specifications includes the step of outputting a list of maximum allowable errors of the machine.

6. A method, as set forth in claim 4, wherein outputting the required set of specifications includes the step of outputting a list of machines from a machine performance database which have the required set of specifications.

7. A method, as set forth in claim 4, wherein the quality index Cp of the machine is a function of error budgeting the resultant tolerance of the machine with respect to external error contributors.

8. A method for determining a set of desired machine specifications, including the steps of:
    inputting information to a processor, the information being relevant to a machine, a machine tool, and a machined part, including information relevant to allowable tolerances of the machined part;
    determining a required set of specifications of the machine as a function of the information, including allowable machine error specifications; and
    outputting the required set of specifications to a user.

9. A method, as set forth in claim 8, wherein inputting information to a processor includes the steps of:
    inputting a desired machine configuration;
    inputting information relevant to a work volume of the machine;
    inputting information relevant to a maximum deviation of the machine tool from an intended path;

inputting a quality index Cp of the machine, the quality index being a function of a percent contribution of the machine to a quality of the machined part;

inputting information relevant to at least one feature of the machined part;

inputting information relevant to a size of the machine tool; and inputting information defining at least one axis for the machine tool to travel to make the at least one feature of the machined part.

10. A method, as set forth in claim 8, wherein determining a required set of specifications of the machine includes the steps of:

determining a set of worst case points for each of the at least one machined part feature;

determining a set of potential error terms corresponding to the set of worst case points, the potential error terms being a function of errors associated with the machine and the machine tool;

predicting a set of errors associated with the machined part as a function of the set of potential error terms;

determining a set of geometric dimensions and tolerances of each of the at least one machined part feature as a function of the predicted set of errors; and determining a resultant set of machine specifications as a function of the geometric dimensions and tolerances.

11. A method, as set forth in claim 10, wherein outputting the required set of specifications includes the step of outputting at least one of a list of maximum allowable errors of the machine and a list of machines from a machine performance database which have the required set of specifications.

12. A method for determining a set of desired machine specifications by a processor, including the steps of:

receiving information relevant to a machine, a machine tool, and a machined part, the information relevant to the machined part including at least one machined part feature;

determining a set of worst case points for each of the at least one machined part feature;

determining a set of potential error terms corresponding to the set of worst case points, the potential error terms being a function of errors associated with the machine and the machine tool;

determining a set of geometric dimensions and tolerances of each of the at least one machined part feature as a function of the potential error terms; and determining a resultant set of machine specifications as a function of the geometric dimensions and tolerances.

13. A method, as set forth in claim 12, further including the step of providing the determined set of machine specifications to a user.

14. A method, as set forth in claim 13, wherein providing the determined set of machine specifications to a user includes the step of providing a list of allowable errors of the machine to the user.

15. A method, as set forth in claim 13, wherein providing the determined set of machine specifications to the user further includes the step of providing a list of machines having the determined set of machine specifications to the user.

16. A method, as set forth in claim 15, wherein the list of machines is provided by a machine performance database.

17. A method, as set forth in claim 12, further including the step of predicting a set of errors associated with the machined part as a function of the set of potential error terms, the set of geometric dimensions and tolerances of each of the at least one machined part feature being further determined as a function of the predicted set of errors.

18. A method, as set forth in claim 12, wherein determining a resultant set of machine specifications includes the step of calculating a final resultant tolerance for each of the at least one machine part feature using a sum-of-squares analysis.

19. A system for determining a set of desired machine specifications, comprising:

an input module for inputting information to a processor, the information being relevant to a machine, a machine tool, and a machined part, including information relevant to allowable tolerances of the machined part;

a processing module for determining a required set of specifications of the machine as a function of the information, including machine error specifications; and an output module for outputting the required set of specifications to a user.

20. A system for determining a set of desired machine specifications, comprising:

an input module for receiving information relevant to a machine, a machine tool, and a machined part, the information relevant to the machined part including at least one machined part feature;

a processing module for;

determining a set of worst case points for each of the at least one machined part feature;

determining a set of potential error terms corresponding to the set of worst case points, the potential error terms being a function of errors associated with the machine and the machine tool;

determining a set of geometric dimensions and tolerances of each of the at least one machined part feature as a function of the potential error terms; and determining a resultant set of machine specifications as a function of the geometric dimensions and tolerances; and an output module for providing the determined set of machine specifications to a user.

* * * * *